United States Patent
Gleeson et al.

(10) Patent No.: US 10,197,456 B2
(45) Date of Patent: Feb. 5, 2019

(54) SYSTEMS AND METHODS FOR MEASURING TEMPERATURE IN A GAS TURBINE USING ACOUSTIC INTERFERENCE

(71) Applicant: General Electric Company, Schenectady, NY (US)

(72) Inventors: Eamon P. Gleeson, Atlanta, GA (US); Fei Han, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 74 days.

(21) Appl. No.: 15/229,613

(22) Filed: Aug. 5, 2016

(65) Prior Publication Data

US 2016/0341606 A1 Nov. 24, 2016

Related U.S. Application Data

(63) Continuation-in-part of application No. 14/611,639, filed on Feb. 2, 2015.

(51) Int. Cl.
*G01K 11/22* (2006.01)
*G01K 13/02* (2006.01)
*G01M 15/14* (2006.01)

(52) U.S. Cl.
CPC ............ *G01K 11/22* (2013.01); *G01K 13/02* (2013.01); *G01M 15/14* (2013.01); *G01K 2013/024* (2013.01)

(58) Field of Classification Search
CPC combination set(s) only.
See application file for complete search history.

(56) References Cited

U.S. PATENT DOCUMENTS

| | | | |
|---|---|---|---|
| 3,566,689 A * | 3/1971 | Ringwall et al. | F15C 1/005 137/804 |
| 4,650,346 A | 3/1987 | Tehon | |
| 4,655,608 A | 4/1987 | Goss et al. | |
| 4,817,615 A | 4/1989 | Fukukita et al. | |
| 5,038,611 A | 8/1991 | Weldon et al. | |
| 5,370,121 A | 12/1994 | Reichenberger et al. | |
| 6,481,287 B1 | 11/2002 | Ashworth et al. | |
| 2010/0023298 A1* | 1/2010 | Bosselmann | G01B 15/00 702/159 |
| 2013/0216083 A1* | 8/2013 | McElveen | G10K 11/26 381/337 |

* cited by examiner

*Primary Examiner* — Lisa Caputo
*Assistant Examiner* — Nasir U Ahmed
(74) *Attorney, Agent, or Firm* — Eversheds-Sutherland (US) LLP

(57) ABSTRACT

Systems and methods for measuring temperature in a gas turbine are disclosed. The method can include directing a first acoustic signal and a second acoustic signal towards a gas path in a turbine; receiving the first acoustic signal and the second acoustic signal at a downstream gas path location; combining the first acoustic signal and the second acoustic signal to create a combined acoustic signal, wherein the combined acoustic signal forms at least one of either a signal maxima or a signal minima; and based at least in part on the combined acoustic signal, determining a temperature of the gas path.

20 Claims, 13 Drawing Sheets

SYSTEMS AND METHODS FOR MEASURING TEMPERATURE IN A GAS TURBINE USING ACOUSTIC INTERFERENCE

CROSS-REFERENCE TO RELATED APPLICATION

This application is a continuation-in-part application and claims priority to U.S. patent application Ser. No. 14/611,639, titled "Systems and Methods for Measuring Temperature in a Gas Turbine Using Acoustic Interference," filed on Feb. 2, 2015, the contents of which are incorporated herein by reference.

TECHNICAL FIELD

Embodiments of this disclosure generally relate to gas turbines, and more specifically to systems and methods for measuring temperatures in a gas turbine using acoustic interference.

BACKGROUND

The control and health management of turbine engines can depend on accurately measuring temperatures throughout the engine. Accurate and reliable temperature measurements may be used for estimating the performance and health status of various engine components. Some of the instrumentation typically used for measuring temperature may include sensors and thermocouples. However, with gas temperatures reaching well above 2000° F., these components may be exposed to extremely harsh conditions, making them susceptible to degradation and failure.

BRIEF DESCRIPTION OF THE DISCLOSURE

Some or all of the above needs and/or problems may be addressed by certain embodiments of the disclosure. Certain embodiments may include systems and methods for measuring temperature in a gas turbine using acoustic interference. According to one embodiment of the disclosure, a method for measuring temperature in a turbine can be provided. The method may include directing a first acoustic signal and a second acoustic signal towards a gas path in a turbine; receiving the first acoustic signal and the second acoustic signal at a downstream gas path location; combining the first acoustic signal and the second acoustic signal to create a combined acoustic signal, wherein the combined acoustic signal can form at least one of either a signal maxima or a signal minima; and based at least in part on the combined acoustic signal, a temperature of the gas path can be determined.

According to another embodiment of the disclosure, a system is provided. The system may include a measurement device that is coupled to a controller. The measurement device may include at least one sound source that can output an input signal; at least one input microphone that can receive the input signal; a wave splitter that can split the input signal into a first acoustic signal and a second acoustic signal; a carrier waveguide that can direct the first acoustic signal towards a gas path in a gas turbine; an interference waveguide that can direct the second acoustic signal towards the gas path in the gas turbine, where the interference waveguide can be longer than the carrier waveguide; a wave adder that can combine the first acoustic signal and the second acoustic signal to create a combined acoustic signal, wherein the combined acoustic signal can form at least one of a signal maxima or a signal minima; at least one output microphone that can receive the combined acoustic signal; and a damping coil that can dampen the combined acoustic signal. The system may further include at least one memory operable to store computer-executable instructions, where the at least one controller can be configured to determine a temperature of the gas path based at least in part on the combined acoustic signal.

In yet another embodiment, one or more non-transitory computer-readable media storing computer-executable instructions can be provided. The computer-executable instructions, when executed by a controller, can configure the controller to: direct, via at least one carrier waveguide, a first acoustic signal towards a gas path in a turbine; direct, via at least one interference waveguide, a second acoustic signal towards the gas path in the turbine; receive, via at least one wave adder, the first acoustic signal and the second acoustic signal at a downstream gas path location; combine, via the at least one wave adder, the first acoustic signal and the second acoustic signal to create a combined acoustic signal, wherein the combined acoustic signal can form at least one of a signal maxima or a signal minima; receive, via at least one output microphone, the combined acoustic signal, wherein the combined acoustic signal can be damped by a damping coil; and determine, via at least one controller, a temperature of the gas path based at least in part on the combined acoustic signal.

Other embodiments, features, and aspects of the disclosure will become apparent from the following description taken in conjunction with the following drawings.

BRIEF DESCRIPTION OF THE DRAWINGS

Figure 1:
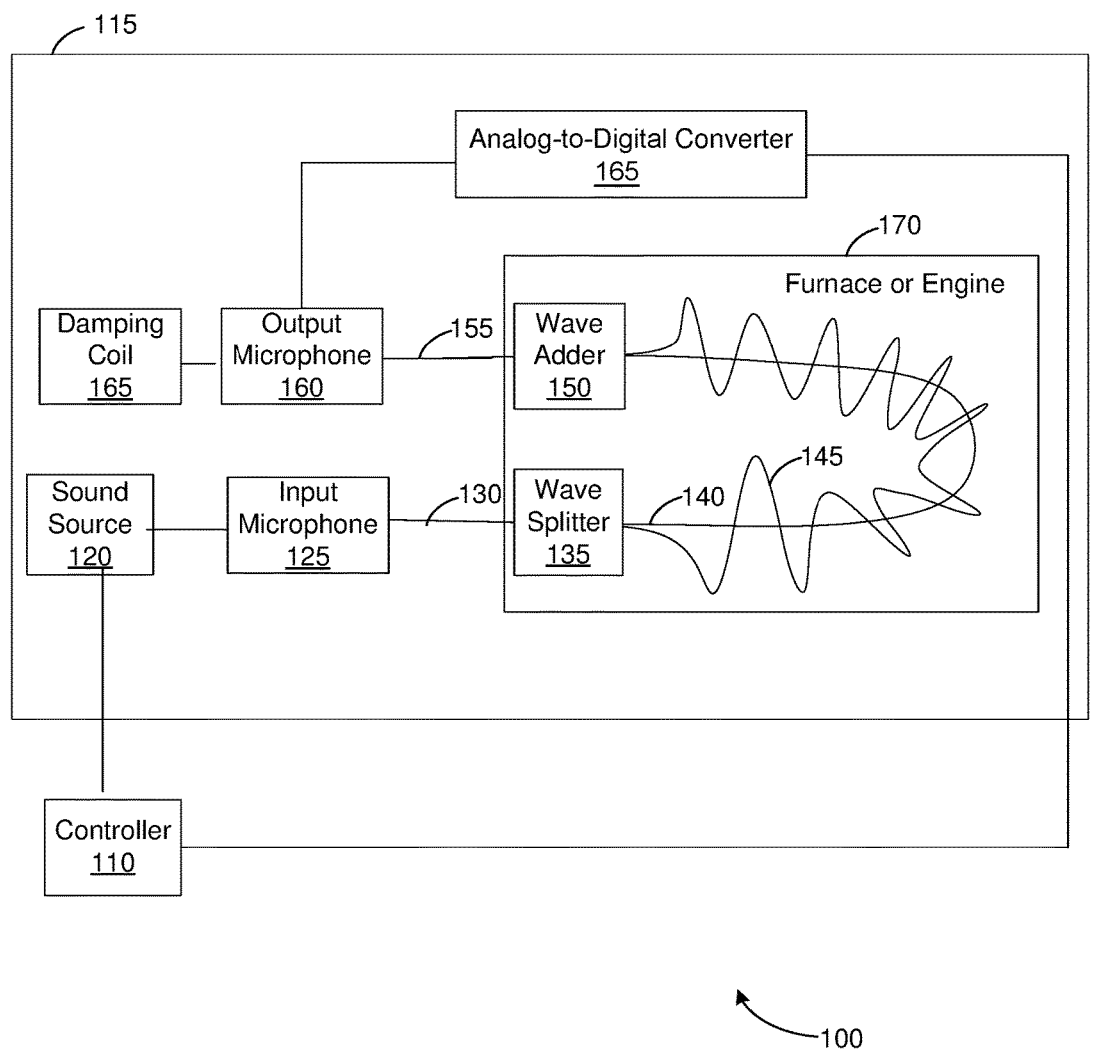

Having thus described the disclosure in general terms, reference will now be made to the accompanying drawings, which are not necessarily drawn to scale, and wherein:

FIG. 1 is a block diagram illustrating an example environment in which systems and methods for measuring temperature in a gas turbine can be implemented, according to an embodiment.

Figure 2:
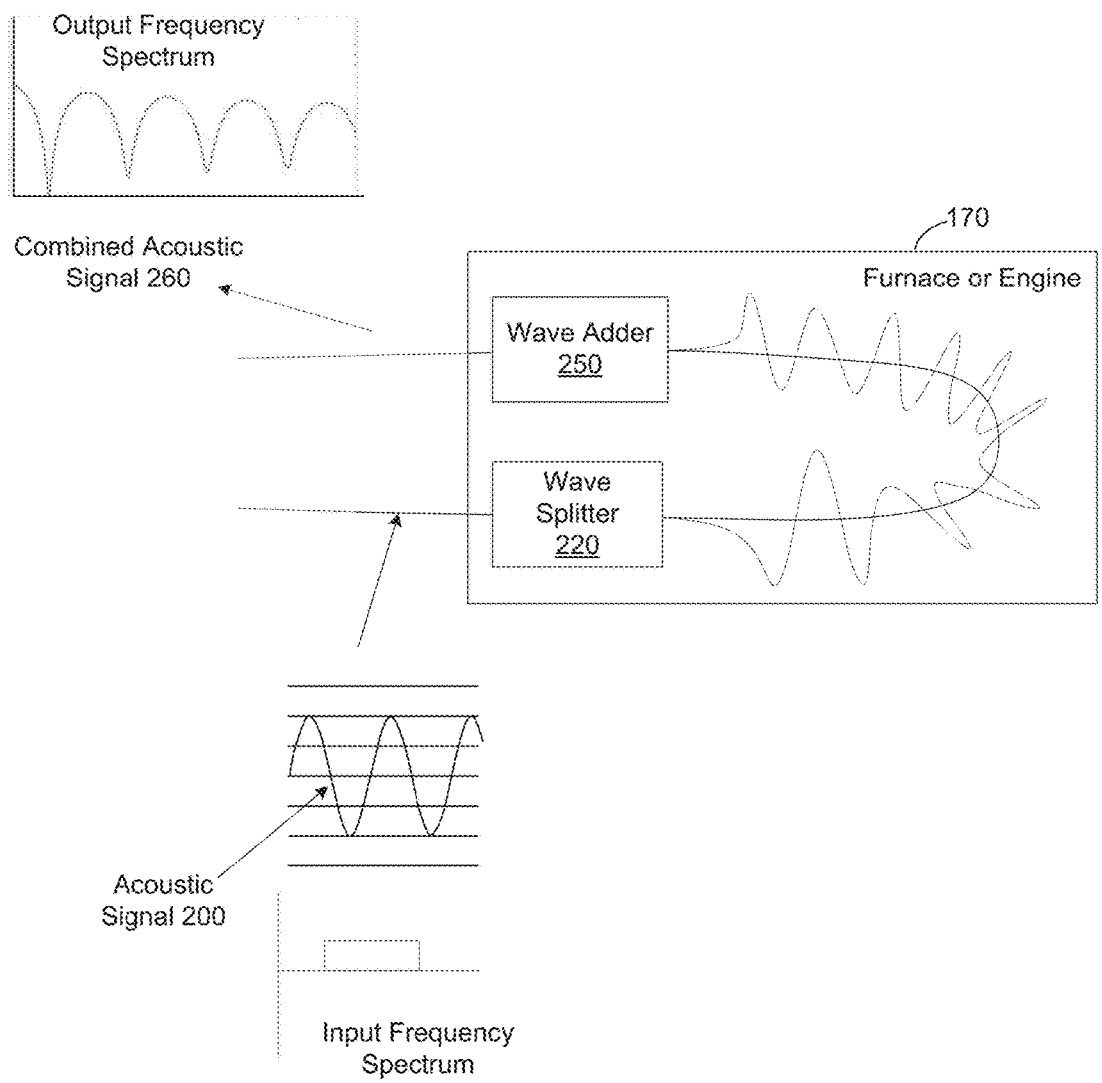

FIG. 2 illustrates an acoustic signal that may be used to measure temperature in a gas turbine, according to an example embodiment.

Figure 3:
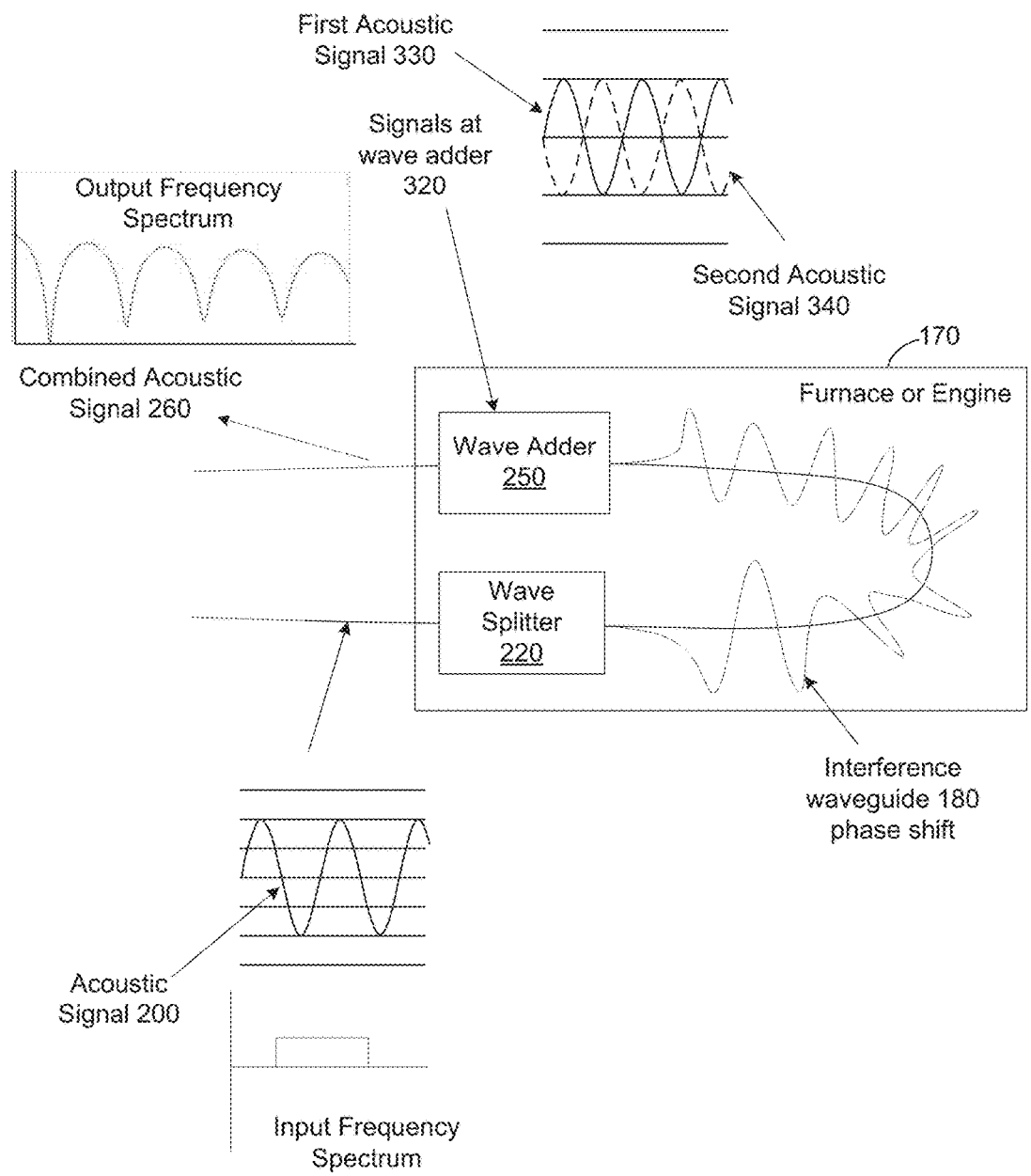

FIG. 3 illustrates an example combined acoustic signal with destructive interference, according to an example embodiment.

Figure 4:
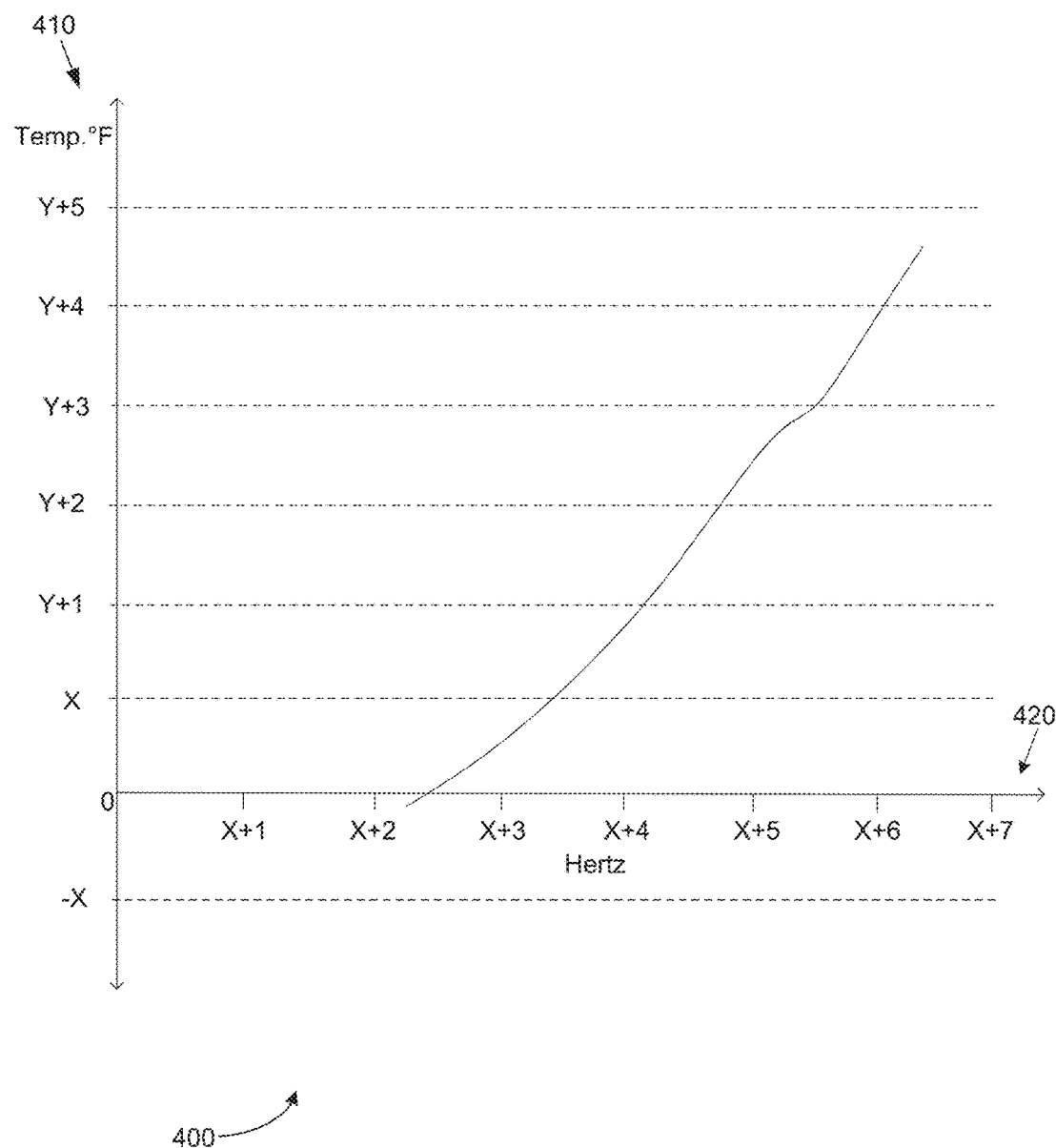

FIG. 4 illustrates a graph of temperature as a function of frequency minima, according to an example embodiment.

Figure 5:
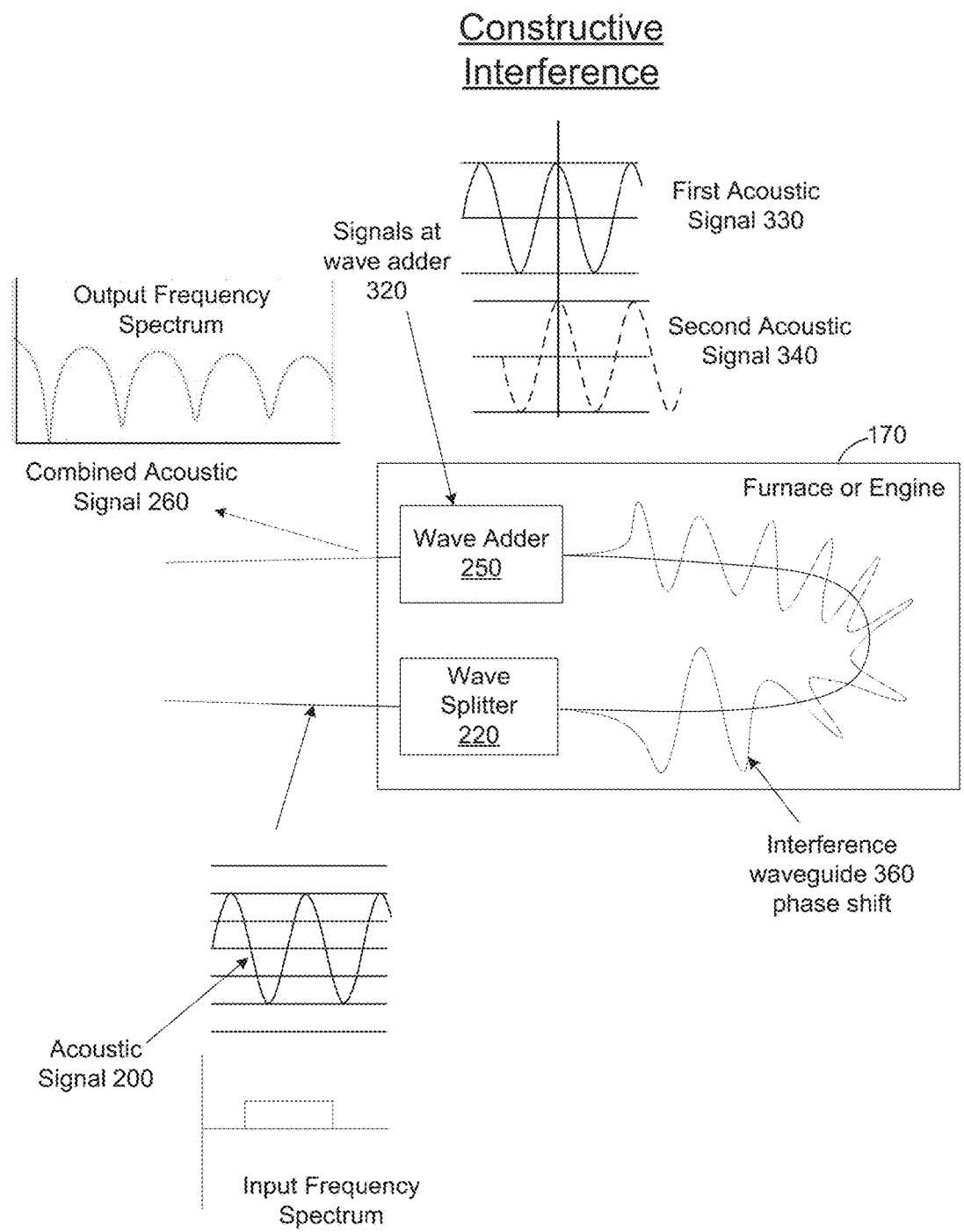

FIG. 5 illustrates an example combined acoustic signal with constructive interference, according to an example embodiment.

Figure 6:
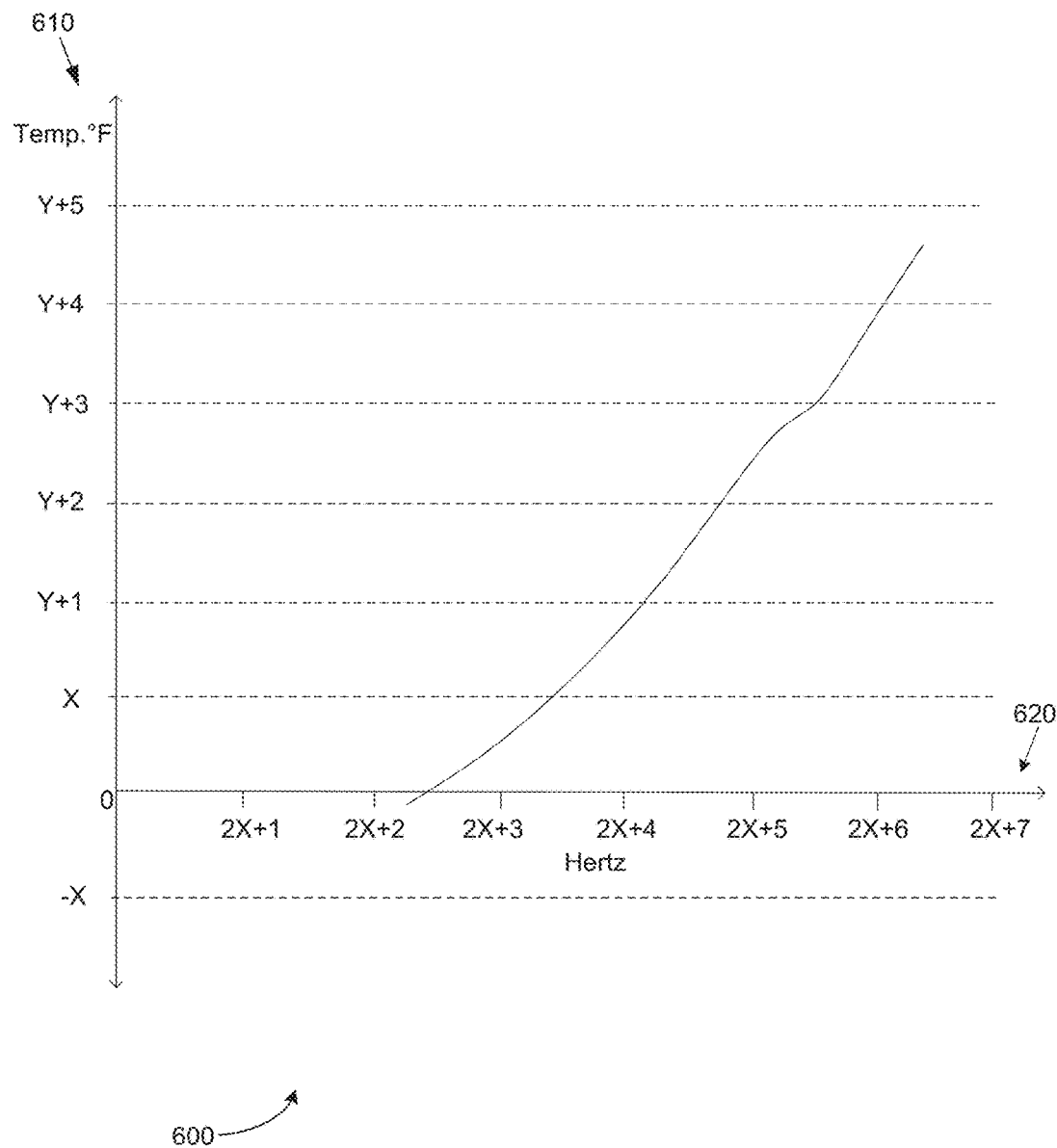

FIG. 6 illustrates a graph of temperature as a function of frequency maxima, according to an example embodiment.

Figure 7:
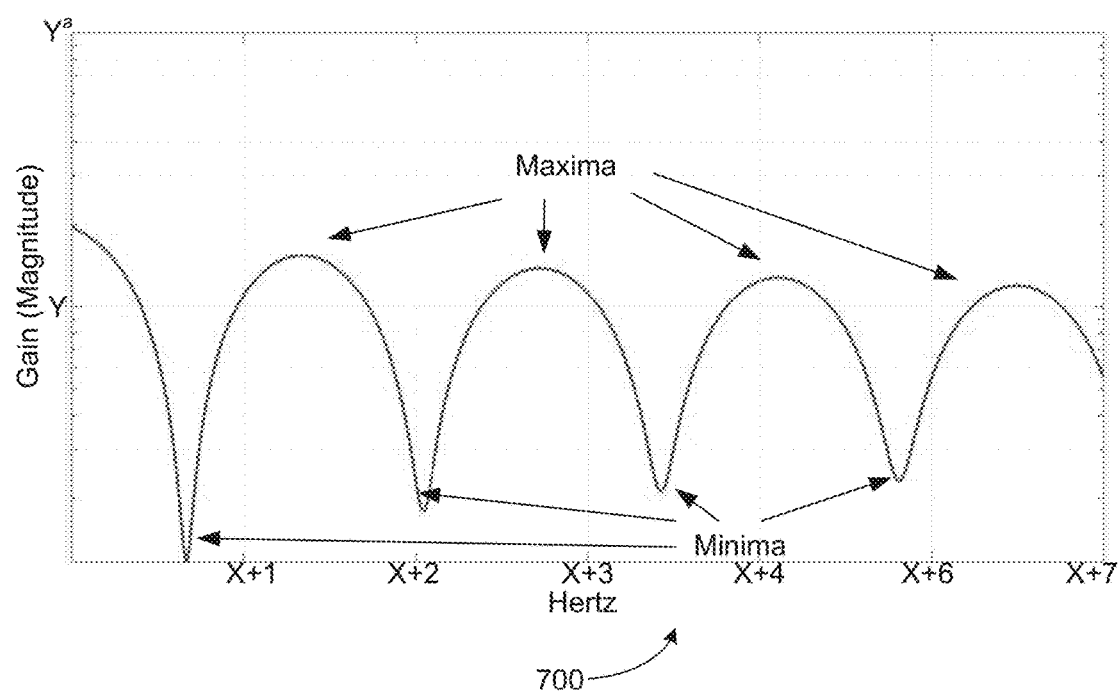

FIG. 7 illustrates an example frequency spectrum of the combined acoustic signal showing maxima and minima at multiple frequencies, according to an example embodiment.

Figure 8:
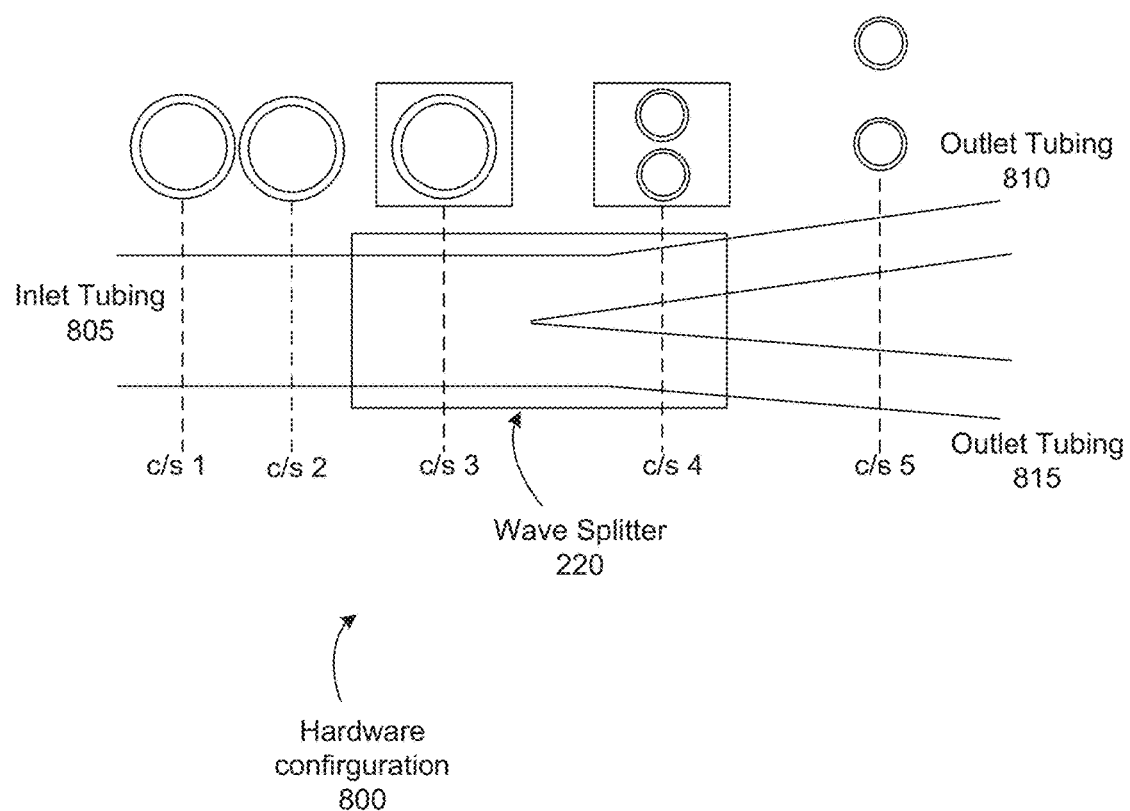

FIG. 8 illustrates an example hardware configuration in which systems and methods for measuring temperature in a gas turbine can be implemented, according to an example embodiment.

Figure 9:
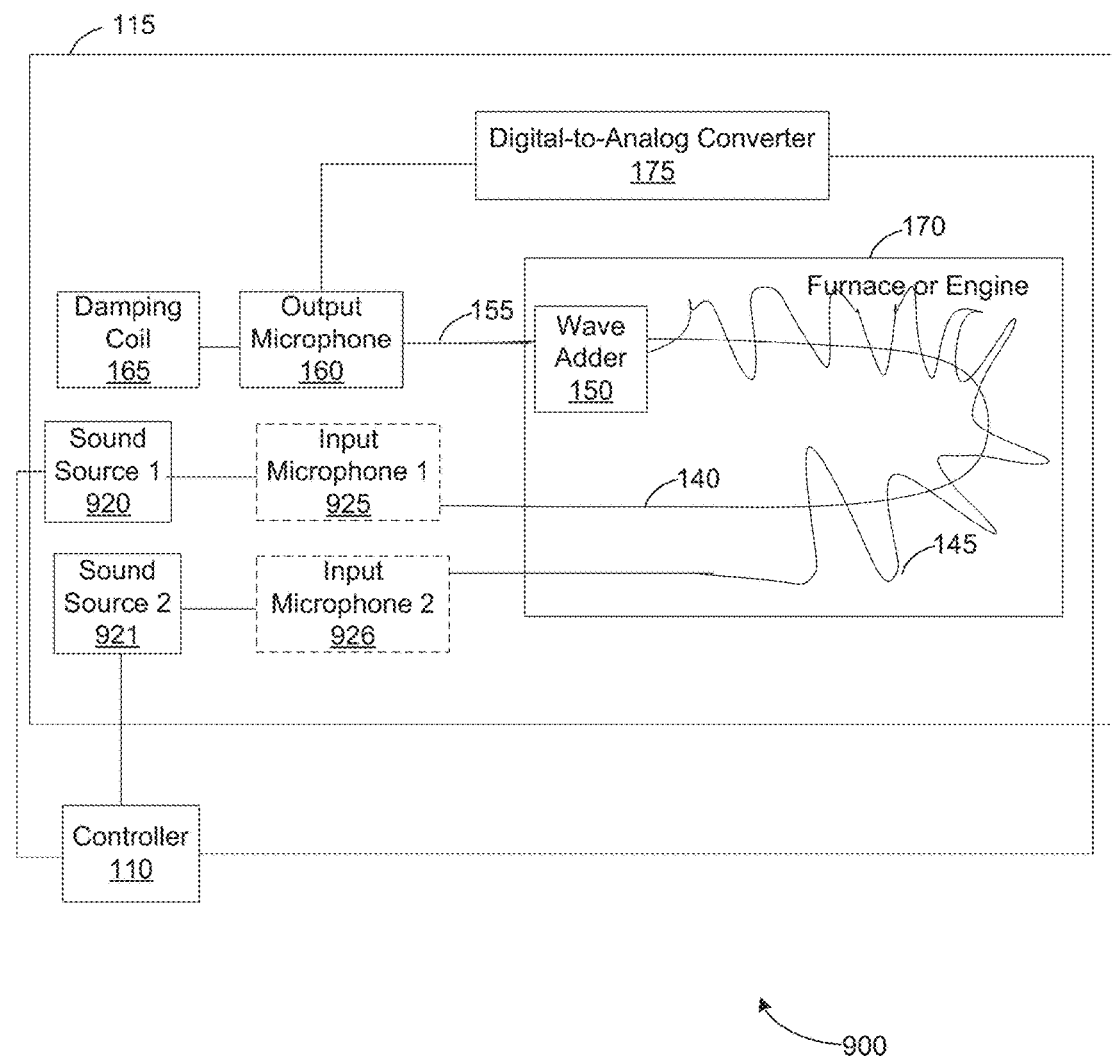

FIG. 9 is a block diagram illustrating an additional example environment in which systems and methods for measuring temperature in a gas turbine can be implemented, according to an example embodiment.

Figure 10:
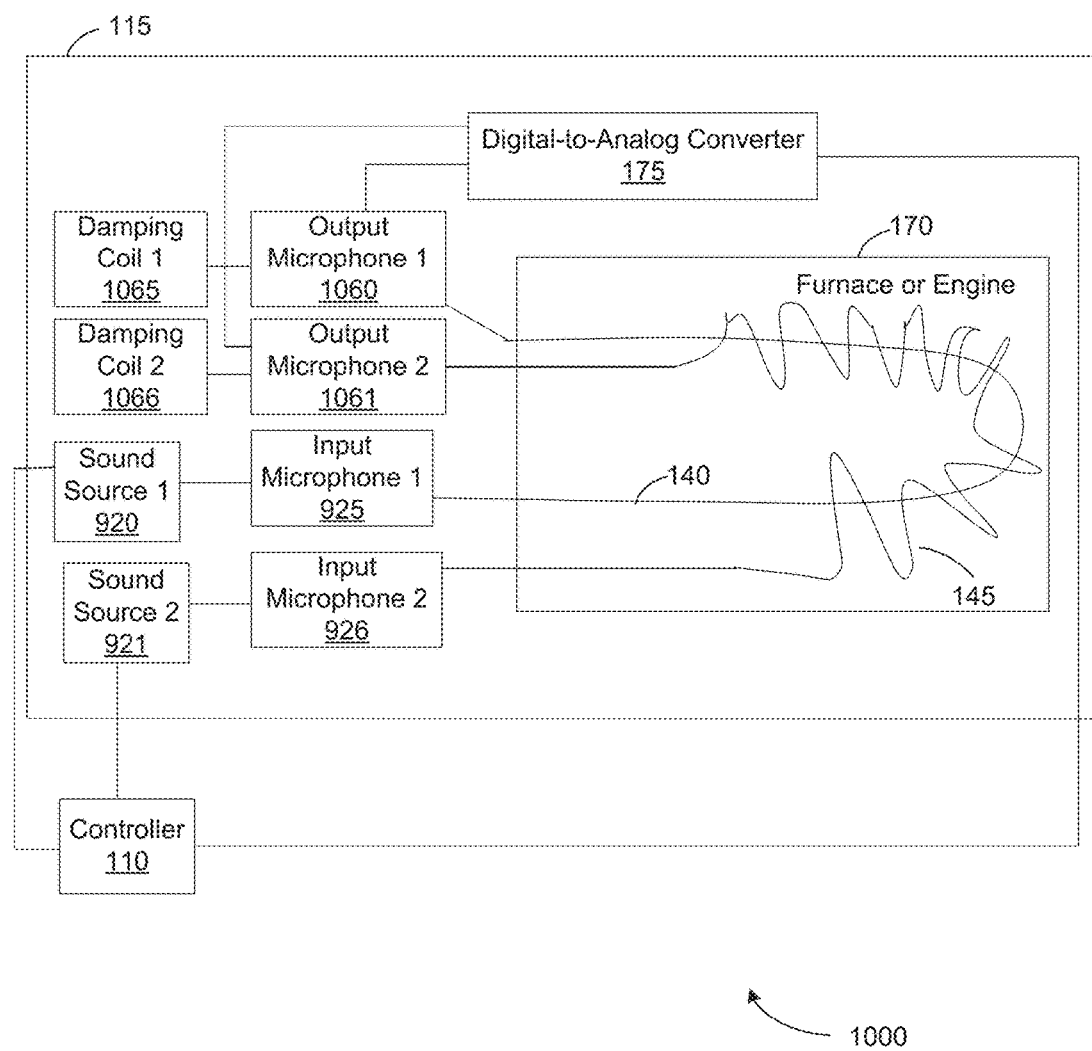

FIG. 10 is a block diagram illustrating an additional example environment in which systems and methods for measuring temperature in a gas turbine can be implemented, according to another example embodiment.

Figure 11:
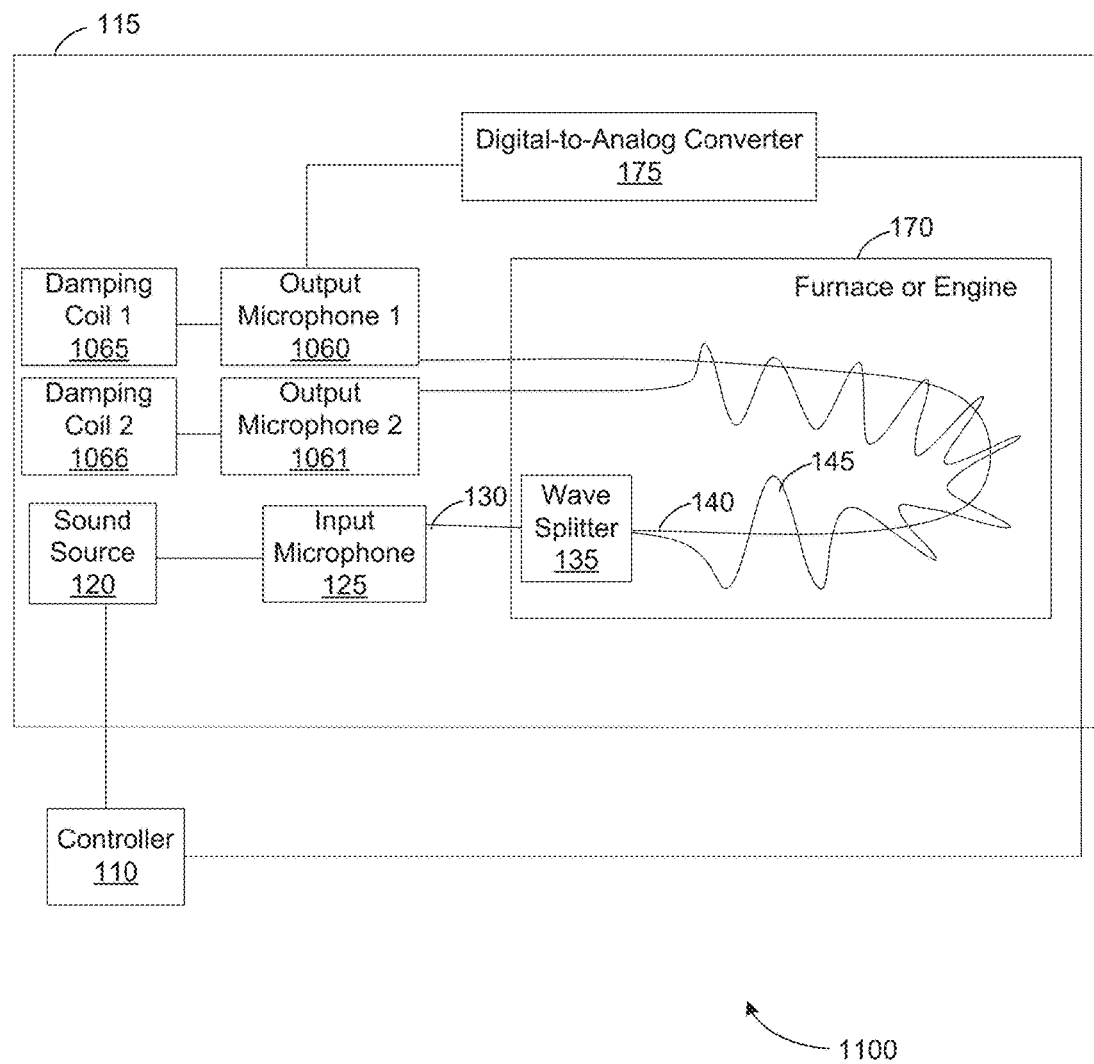

FIG. 11 is a block diagram illustrating an additional example environment in which systems and methods for measuring temperature in a gas turbine can be implemented, according to another example embodiment.

Figure 12:
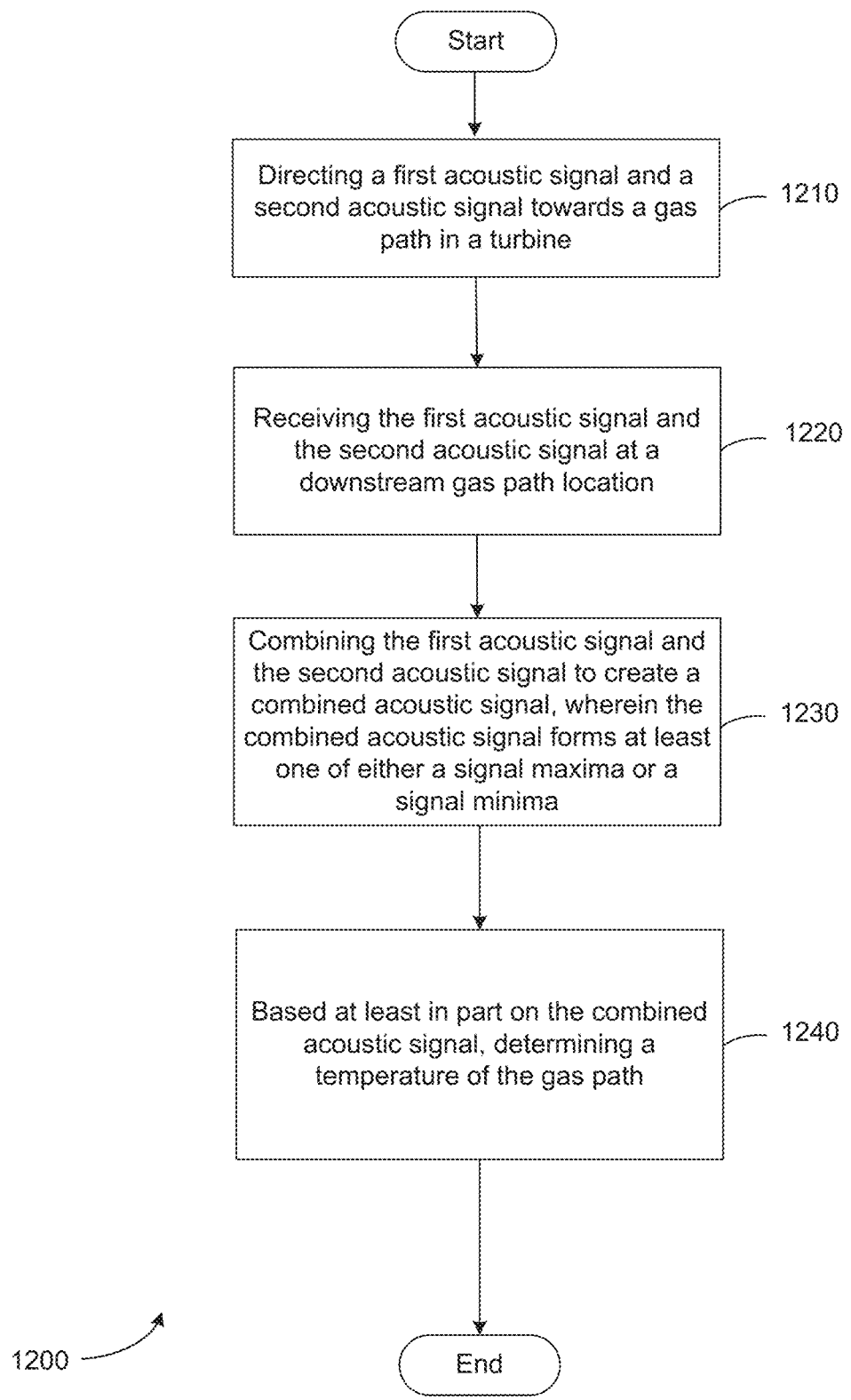

FIG. 12 is a flow chart illustrating a method for measuring temperature in a gas turbine using acoustic interference, according to an example embodiment.

Figure 13:
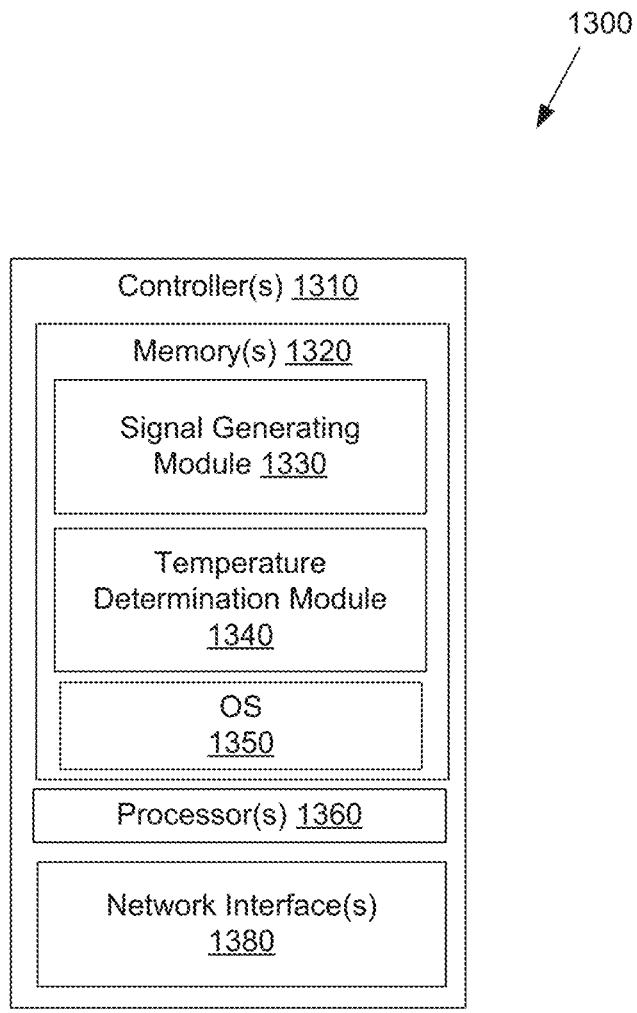

FIG. 13 is a block diagram illustrating an example system for determining temperature in a gas turbine, according to an example embodiment.

DETAILED DESCRIPTION

Illustrative embodiments of the disclosure now will be described more fully hereinafter with reference to the accompanying drawings, in which some but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. Like numbers refer to like elements throughout.

Certain embodiments described herein relate to systems and methods for measuring temperature in a gas turbine using acoustic interference. Certain embodiments may allow for increased accuracy in measuring extreme temperatures in the gas turbine. For example, as will be described in greater detail herein, a first acoustic signal and a second acoustic signal may be directed into a region of high temperatures, such as, a hot gas path of a gas turbine. The first and second acoustic signal may each be separately transmitted through the hot gas path on waveguides of different length. The first and second acoustic signals may then be received at a downstream gas path location. However, because one waveguide can be relatively longer than the other waveguide, it takes one of the acoustic signals a longer amount of time to reach the downstream gas path location, thereby creating a phase shift between the signals when they reach the downstream gas path location. As a result, when the signals are recombined to create a combined acoustic signal, a portion of the first acoustic signal may add with a portion of the second acoustic signal. This recombination may form one or more signal maxima. Alternatively, when the signals are recombined to create a combined acoustic signal, a portion of the first acoustic signal may cancel out a portion of the second acoustic signal. This recombination may form one or more signal minima. The combined acoustic signal may be processed in order to identify a first frequency of the first acoustic signal and a second frequency of the second acoustic signal corresponding to the one or more signal maxima or the one or more signal minima. Based on the first frequency of the first acoustic signal and the second frequency of the second acoustic signal, an average temperature along the hot gas path may be determined using a relationship correlating frequency to temperature corresponding to the signal maxima or the signal minima.

One or more technical effects associated with certain embodiments herein may include, but are not limited to, increased accuracy in measuring high temperatures in a gas turbine. By accurately measuring temperatures in a gas turbine, improved control of the firing temperature of the gas turbine may be achieved, in addition to permitting better management of components within the combustion system. The following provides the detailed description of various example embodiments related to systems and methods for measuring temperature in a gas turbine.

FIG. 1 depicts an example system 100 that facilitates measuring temperature in a gas turbine. According to an example embodiment of the disclosure, the system 100 may include a controller 110 configured to generate an input signal, which may be representative of a desired acoustic wave. The system may further include a measurement device 115, which in turn may include a sound source 120, an input microphone 125, an input waveguide 130, and a wave splitter 135. The sound source 120 may be a device that is operable to receive the input signal generated by the controller 110 and produce an acoustic signal of sound. For example, the sound source 120 may be a speaker, solenoid air valve, a siren, a shaker driven diaphragm, or an air horn. The acoustic signal from the sound source 120 may then be received by an input microphone 125. The input microphone 125 may be a device that is operable to convert the acoustic signal to an electrical signal. The converted acoustic signal may then be transmitted through the input waveguide 130 from the input microphone 125 to a wave splitter 135. As shown in FIG. 1, the wave splitter 135 may be located in a region 170 of high temperatures, such as, for example, a gas turbine engine or furnace. Upon receiving the converted acoustic signal, the wave splitter 135 may be operable to split the acoustic signal into two signals, a first acoustic signal and a second acoustic signal.

With continued reference to FIG. 1, the measurement device 115 may further include a carrier waveguide 140, an interference waveguide 145, and a wave adder 150, which may also be located within the region 170 of high temperatures. As shown in FIG. 1, the wave splitter 135 may be coupled to the wave adder 150 via the carrier waveguide 140 and the interference waveguide 145, where the carrier waveguide 140 and the interference waveguide 145 can be of known lengths. In certain embodiments, the wave splitter 135 may be located in one end of the region 170 and the wave adder 150 may be located in an opposite end of the region 170 at a known distance corresponding to the length of the carrier waveguide 140. In certain embodiments, the first acoustic signal may then be directed from the wave splitter 135 to the wave adder 150 via the carrier waveguide 140. Similarly, the second acoustic signal may be directed from the wave splitter 135 to the wave adder 150 via the interference waveguide 145. The wave adder 150, which may be located at a downstream gas path location, may be configured to combine the first and second acoustic signal to create a combined acoustic signal.

In certain embodiments, the carrier waveguide 140 and the interference waveguide 145 may be of different lengths. The difference in transit times between the first and second acoustic signal may create an interference pattern, which may be evaluated in order to determine the average temperature along the length of the carrier waveguide 140 between the wave splitter 135 and the wave adder 150. For example, in one embodiment, the length of the interference waveguide 145 may be relatively longer than the length of the carrier waveguide 140. As a result, it takes the second acoustic signal a longer amount of time than the first acoustic signal to travel to the wave adder 150 from the wave splitter 135. This can create an interference pattern such that when the first and second acoustic signals are combined by the wave adder 150, a portion of the first acoustic signal adds with a portion of the second acoustic signal to form one or more signal maxima. In certain embodiments, the combined acoustic signal may be further processed to identify a frequency corresponding to the one or more signal maxima, which may be correlated to temperature of gas inside the region 170 using known acoustic thermodynamic and acoustic relationships. An alternate interference pattern can also be created such that when the first and second acoustic signals are combined by the wave adder 150, the first acoustic signal cancels out a portion of the second acoustic signal to form one or more signal minima. In certain embodiments, the combined acoustic signal may be further processed to identify a frequency corresponding to the one or more signal minima, which may be correlated to temperature of gas inside the region 170 using known acoustic thermodynamic and acoustic relationships.

In certain embodiments, the wave adder 150 for combining the first acoustic signal and the second acoustic signal may be an electronic digital circuit that can implement operations to perform addition of acoustic signals. In certain other example embodiments, the wave adder 150 may be a mathematical adder, wherein the first acoustic signal and the second acoustic signal can be recombined through mathematical functions.

In certain embodiments, the length of the carrier waveguide and the length of the interference waveguide can be selected, for example, based at least in part on thermal expansion properties of respective materials of the carrier waveguide and interference waveguide. In an example implementation, the carrier waveguide may be of length x at a reference room temperature and the interference waveguide may of length, for example, 1.5 times x at the reference room temperature. Based on the difference between the temperature of gas inside the region 170 and the reference room temperature, a correction factor that accounts for an expansion coefficient of the carrier waveguide material and an expansion coefficient of the interference waveguide material can be calculated. The correction factor can then be incorporated in the correlation to iteratively update the temperature of gas inside region 170.

Still referring to FIG. 1, the combined acoustic signal may be transmitted outside the region 170 of high temperatures, where it may be processed in order to identify a frequency corresponding to the signal minimum or the signal maximum. To do so, the measurement device 115 may further include an output waveguide 155, an output microphone 160, a damping coil 165, and a digital-to-analog converter 175. The combined acoustic signal may be directed from the wave adder 150 to the output microphone 160 via the output waveguide 155. The output microphone 160 may be operable to generate an electrical wave based on the combined acoustic signal. The output microphone 160 may be coupled at one end to the input of the digital-to-analog converter 175. The electrical wave may be transmitted from the microphone 160 to the digital-to-analog converter 175, which may be operable to generate an analog signal based on the electrical wave. At another end of the output microphone 160, a damping coil 165 may be attached. The damping coil 165 is operable to dampen the combined acoustic signal and reduce signal reflections. Additionally, the digital-to-analog converter 175 may then sample the analog signal in order to acquire data suitable for determining the frequency content of the combined acoustic signal by the controller 110.

With continued reference to FIG. 1, the controller 110 may receive the analog signal and associated data from the digital-to-analog converter 175. Thereafter, the controller 110 may be configured to execute a temperature determination module that employs, for example, fast Fourier transform (FFT) techniques to determine the frequency content of the analog signal in order to identify a particular first frequency of the first acoustic signal and a particular second frequency of the second acoustic signal corresponding to the at least one signal maxima or the at least one signal minima. Based at least in part on the first frequency of the first acoustic signal and the second frequency of the second acoustic signal, the temperature determination module may be operable to determine a temperature in the gas turbine using the temperature frequency profile. In certain embodiments, the determined temperature may be used by the controller 115 to assist in management of the gas turbine.

As desired, embodiments of the disclosure may include a system 100 with more or fewer components than are illustrated in FIG. 1. Additionally, certain components of the system 100 may be combined in various embodiments of the disclosure. The system 100 of FIG. 1 is provided by way of example only.

Referring now to FIG. 2, shown is an acoustic signal 200 transmitted to a wave splitter 220 from a sound source, such as sound source 120 in FIG. 1. As shown in FIG. 2, in certain embodiments, the acoustic signal 200 may have an input frequency spectrum that can be a specific bandwidth of frequency. In order to detect frequency minima or frequency maxima, the acoustic signal 200 can have frequency content on either side of the cancelled or added frequency, as indicated by the specific bandwidth of frequency of the acoustic signal 200 in FIG. 2. Also indicated is the wave adder 250, where the acoustic signals are recombined to create the combined acoustic signal 260. In an example embodiment, the combined acoustic signal 260 of FIG. 2 shows an output frequency spectrum with specific minima and maxima that repeat.

FIG. 3 depicts an example embodiment, where destructive interference of acoustic signals can occur. As shown in FIG. 3, a first acoustic signal 330 and a second acoustic signal 340 can be transmitted to a wave adder 250 from the wave splitter 220. In certain embodiments, the first acoustic signal 330 and the second acoustic signal 340 may be transmitted from the wave splitter 220 to the wave adder 250 on waveguides of different lengths, which creates a phase shift between the first acoustic signal 330 and the second acoustic signal 340 when they reach the wave adder 250.

As can be seen in FIG. 3, a 180 degree phase shift may be created between the first acoustic signal 330 and the second acoustic signal 340 when they reach the wave adder 250 at a specific frequency. Accordingly, when the first acoustic signal 330 and the second acoustic signal 340 are combined by the wave adder 250 to create a combined acoustic signal 260, a portion of the first acoustic signal 330 cancels out a portion of the second acoustic signal 340. As a result, the combined acoustic signal 260 may have an output frequency spectrum with a specific frequency being cancelled out. For a specific temperature in region 170, there can be a specific frequency of the input acoustic signal 200 that can cause destructive interference at the wave adder. This frequency may be correlated to a temperature in a gas turbine, such as, for instance, an exhaust temperature, a temperature within the hot gas path, the actual firing temperature, and the like.

Referring now to FIG. 4, shown is a graph 400 illustrating an example temperature-frequency profile for the first minima in accordance with an example embodiment. As shown in FIG. 4, the graph 400 may include a y-axis 410 corresponding to temperature in degrees Fahrenheit and a x-axis 420 corresponding to frequency in Hertz.

With continued reference to FIG. 4, in certain embodiments, a controller, such as controller 110 in FIG. 1, may be operable to identify a particular frequency corresponding to the signal minimum in a combined acoustic signal. Based on the identified frequency, the controller may further be operable to access graph 400 in order to determine a temperature in a gas turbine using a relationship correlating frequency to temperature. For example, if the frequency corresponding to the signal minimum can be approximately 778 Hertz, the controller may determine that the average temperature along a hot gas path of the gas turbine can be approximately 752° F.

FIG. 5 depicts an example embodiment, where constructive interference of acoustic signals can occur. As shown in FIG. 5, a first acoustic signal 330 and a second acoustic signal 340 can be transmitted to the wave adder 250 from the wave splitter 220. In certain embodiments, the first acoustic signal 330 and the second acoustic signal 340 may be transmitted from the wave splitter 220 to the wave adder 250 on waveguides of different length, which creates a phase shift between the first acoustic signal 230 and the second acoustic signal 240 when they reach the wave adder 250.

As can be seen in FIG. 5, a 360 degree phase shift may be created between the first acoustic signal 330 and the second acoustic signal 340 when they reach the wave adder 250 at a specific frequency. Accordingly, when the first acoustic signal 330 and the second acoustic signal 340 are combined by the wave adder 250 to create a combined acoustic signal 260, a portion of the first acoustic signal 330 adds with a portion of the second acoustic signal 340 to form a maximum. As a result, the combined acoustic signal 260 may have an output frequency spectrum with one or more maxima at a specific frequency. For a specific temperature in region 170, there can be a specific frequency of the input acoustic signal 200 that can cause constructive interference at the wave adder. This frequency may be correlated to a temperature in a gas turbine, such as, for instance, an exhaust temperature, a temperature within the hot gas path, the actual firing temperature, and the like.

Referring now to FIG. 6, shown is a graph 600 illustrating an example temperature-frequency profile for the first maxima in accordance with an example embodiment. As shown in FIG. 6, the graph 600 may include an x-axis 610 corresponding to temperature in degrees Fahrenheit and a y-axis 620 corresponding to frequency in Hertz.

With continued reference to FIG. 6, in certain embodiments, a controller, such as controller 110 in FIG. 1, may be operable to identify a particular frequency corresponding to the signal maximum in a combined acoustic signal. Based on the identified frequency, the controller may further be operable to access graph 600 in order to determine a temperature in a gas turbine using a relationship correlating frequency 620 to temperature 610. For example, if the frequency corresponding to the signal maximum can be approximately 1557 Hertz, the controller may determine that the average temperature along a hot gas path of the gas turbine can be approximately 752° F.

Referring now to FIG. 7, shown is an example output frequency spectrum 700 of the combined acoustic signal, where several maxima and minima at frequencies higher than the first maxima and the first minima can be observed. As an example, if the first minima occurred at Fmin1, additional minima can be observed at frequencies of Fmin1× n, where n=1, 3, 5, 9 and so on. Additional maxima can be observed at frequencies of Fmax1×n, where n=2, 4, 6, 8 and so on. In an example embodiment, the acoustic signal input frequencies that cause the first minima and the first maxima can be combined in an algorithm to determine the temperature in a gas turbine. In another example embodiment, the temperature within the hot gas path can be determined by gathering a set of higher frequencies causing additional maxima or additional minima.

Referring now to FIG. 8, shown is an example hardware configuration 800 of a system for measuring high temperatures in a gas turbine using acoustic interference. The inlet tubing 805 carries the acoustic signal 200 of FIG. 2, and can be of any typical tubing material, such as, for example, stainless steel. The tubing can be the split into two tubes or waveguides at the wave splitter 220. Outlet tubing 810 and outlet tubing 815 carry the first acoustic signal and the second acoustic signal respectively. The length of the outlet tubing can be varied to achieve the appropriate interference between the first acoustic signal and the second acoustic signal. FIG. 8 further indicates the tubing cross-sectional shape along the length of the hardware configuration, for example, at c/s 1, c/s 2, c/s 3 and so on. In an example embodiment, the cross-sectional area of the inlet tubing, for example, at c/s 1, can be at least greater than half the combined cross-sectional area of the outlet tubing 810 and 815.

As desired, embodiments of the disclosure may include more or fewer hardware components than are illustrated in FIG. 8. Additionally, certain components of the hardware configuration 800 may be combined in various embodiments of the disclosure. The hardware configuration 800 of FIG. 8 is provided by way of example only.

FIG. 9 depicts an example system 900 that facilitates measuring temperature in a gas turbine. According to an example embodiment of the disclosure, the system 900 may include the controller 110 of FIG. 1 configured to generate one or more input signals. The system may further include the measurement device 115 of FIG. 1, which in turn may include at least two sound sources 920 and 921. Similar to the sound source 120 of FIG. 1, the sound sources 920 and 921 may be devices that are operable to receive the input signal generated by the controller 110 of FIG. 1 and produce acoustic signals of sound, for example, the first acoustic signal and the second acoustic signal. For example, the sound sources 920 and 921 may be speakers, solenoid air valves, sirens, shaker driven diaphragms, or air horns. The acoustic signal from the sound sources 920 and 921 may then be optionally received by input microphones 925 and 926 respectively. Similar to input microphone 125 of FIG. 1, the input microphones 925 and 926 may be devices that are operable to measure and convert acoustic signals to electrical signals. The converted acoustic signal may then be transmitted from the input microphones 925 and 926 through the gas turbine engine or furnace.

With continued reference to FIG. 9, the measurement device 115 of FIG. 1 may further include the carrier waveguide 140, an interference waveguide 145, and a wave adder 150, which may also be located within the region 170 of high temperatures. As shown in FIG. 9, the carrier waveguide 140 and the interference waveguide 145 may transmit the first acoustic signal and the second acoustic signal to the wave adder 150, where the carrier waveguide 140 and the interference waveguide 145 may be of known lengths. It may be appreciated that the first acoustic signal and the second acoustic signal may be directly transmitted from the input microphones 925 and 926. The wave adder 150, which may be located at a downstream gas path location, may be configured to combine the first and second acoustic signal to create a combined acoustic signal.

With continued reference to FIG. 9, the functionality of the rest of the example system, including the output microphone 160, damping coil 165, and the digital-to-analog converter 175 may be similar to that in FIG. 1.

FIG. 10 depicts an example system 1000 that facilitates measuring temperature in a gas turbine. According to an example embodiment of the disclosure, the system 1000 may include the controller 110 of FIG. 1 configured to generate one or more input signals. The system may further include the measurement device 115 of FIG. 1, which in turn may include at least two sound sources 920 and 921, as in FIG. 9. The sound sources 920 and 921 may be devices that are operable to receive the input signal generated by the controller 110 and produce acoustic signals of sound, for example, the first acoustic signal and the second acoustic signal. The acoustic signal from the sound sources 920 and 921 may then be received by input microphones 925 and 926, as in FIG. 9. The converted acoustic signal may then be transmitted from the input microphones 925 and 926 through the gas turbine engine or furnace.

With continued reference to FIG. 10, the measurement device 115 of FIG. 1 may further include the carrier waveguide 140, an interference waveguide 145, which may also be located within the region 170 of high temperatures. As shown in FIG. 10, the carrier waveguide 140 and the interference waveguide 145 may transmit the first acoustic signal and the second acoustic signal to output microphones 1060 and 1061 respectively, where the carrier waveguide 140 and the interference waveguide 145 may be of known lengths.

Still referring to FIG. 10, the first acoustic signal and second acoustic signal may be transmitted outside the region 170 of high temperatures, where they may be processed in order to identify a frequency corresponding to the signal minimum or the signal maximum. To do so, the measurement device 115 of FIG. 1 may further include output microphone 1060 and 1061, damping coils 1065 and 1066, and a digital-to-analog converter 175. The output microphones 1060 and 1061 may be operable to measure and generate electrical waves based on the first acoustic signal and the second acoustic signal. The output microphones 1060 and 1061 may be coupled at one end to the input of the digital-to-analog converter 175. The electrical wave may be transmitted from the output microphones 1060 and 1061 to the digital-to-analog converter 175 of FIG. 1, which may be operable to generate an analog signal based on the electrical waves. Signal sampling from the two output microphones 1060 and 1061 can occur simultaneously in time, so that mathematical recombination of the first acoustic signal and the second acoustic signal can occur to create the combined acoustic signal. At another end of the output microphones 1060 and 1061, damping coils 1065 and 1066 may be attached. The damping coils 1065 and 1066 are operable to dampen the first acoustic signal and the second acoustic signal and reduce signal reflections. Additionally, the digital-to-analog converter 175 may then sample the first and second acoustic signals in order to acquire data suitable for determining the frequency content of the signal by the controller 110.

With continued reference to FIG. 10, the functionality of the rest of the example system 1000, including the controller 110, may be similar to that in FIG. 1.

FIG. 11 depicts an example system 1100 that facilitates measuring temperature in a gas turbine. According to an example embodiment of the disclosure, the system 1100 may include the controller 110 of FIG. 1 configured to generate an input signal, which may be representative of a desired acoustic wave. The system may further include the measurement device 115 of FIG. 1, which in turn may include the sound source 120, the input microphone 125, the input waveguide 130, and the wave splitter 135. The acoustic signal from the sound source 120 may then be received by the input microphone 125. The acoustic signal may then be transmitted through the input waveguide 130 from the input microphone 125 to a wave splitter 135. As in FIG. 1, the wave splitter 135 may be located in a region 170 of high temperatures, such as, for example, a gas turbine engine or furnace. Upon receiving the converted acoustic signal, the wave splitter 135 may be operable to split the acoustic signal into two identical signals, the first acoustic signal and the second acoustic signal.

Still referring to FIG. 11, the first acoustic signal and second acoustic signal may be transmitted outside the region 170 of high temperatures, where they may be processed in order to identify a first frequency and a second frequency respectively corresponding to the signal minimum or the signal maximum. To do so, the measurement device 115 may further include output microphones 1060 and 1061, damping coils 1065 and 1066, and a digital-to-analog converter 175 as in FIG. 10. The output microphones 1060 and 1061 may be operable to generate electrical waves based on the first acoustic signal and the second acoustic signal. The output microphones 1060 and 1061 may be coupled at one end to the input of the digital-to-analog converter 175. The electrical waves may be transmitted from the output microphones 1060 and 1061 to the digital-to-analog converter 175, which may be operable to generate an analog signal based on the electrical waves. Signal sampling from the two output microphones 1060 and 1061 can occur simultaneously in time, so that mathematical recombination of the first acoustic signal and the second acoustic signal can occur to create the combined acoustic signal. At another end of the output microphones 1060 and 1061, damping coils 1065 and 1066 may be attached. The damping coils 1065 and 1066 are operable to dampen the first acoustic signal and the second acoustic signal and reduce additional signal reflections. Additionally, the digital-to-analog converter 175 may then sample the analog signal in order to acquire data suitable for determining the frequency content of the signal by the controller 110, as in FIG. 10.

With continued reference to FIG. 11, the functionality of the rest of the example system 1100, including the controller 110, may be similar to that in FIG. 1.

Referring now to FIG. 12, shown is a flow diagram of an example method 1200 for measuring high temperatures in a gas turbine using acoustic interference, according to an example embodiment. The method 1200 may be utilized in association with various systems, such as the system 100 illustrated in FIG. 1, the system 900 illustrated in FIG. 9, the system 1000 illustrated in FIG. 10, and/or the system 1100 illustrated in FIG. 11, using controller 110 and measurement device 115.

The method 1200 may begin at block 1210. At block 1210, a first acoustic signal and a second acoustic signal may be directed towards the gas path in the turbine. In certain embodiments, the first and second acoustic signals may be created from an acoustic signal transmitted to a wave splitter, such as wave splitter 135 in FIG. 1, which is operable to split the acoustic signal into the first and second acoustic signals.

Next, at block 1220, the method 1200 may include receiving the first acoustic signal and the second acoustic signal at a downstream gas path location. A wave adder, such as, wave adder 150 in FIG. 1, may be located at a downstream gas path location and operable to receive the first and the second acoustic signal. In certain embodiments, the first acoustic signal may be directed from a wave splitter to the wave adder via a carrier waveguide, such as carrier waveguide 140 in FIG. 1. Similarly, the second acoustic signal may be directed from the wave splitter to the wave adder via an interference waveguide, such as interference waveguide 145 in FIG. 1, where the interference waveguide can be longer than the carrier waveguide in order to create an interference pattern between the two signals when they are recombined.

Next, at block 1230, the method 1200 may include combining the first acoustic signal and the second acoustic signal to create a combined acoustic signal, where the combined acoustic signal forms at least one of either a signal maxima or a signal minima.

Next, at block 1240, the method 1200 may include determining a temperature of a gas path based at least on the combined acoustic signal. In certain embodiments, the temperature of the gas path may be determined by a controller, such as, controller 110 in FIG. 1. The controller may be operable to process the combined acoustic signal in order to identify a frequency corresponding to where a portion of the first acoustic signal adds to a portion of the second acoustic signal or cancels out a portion of the second acoustic signal. Based on the identified frequency, the controller may determine a temperature in the gas turbine using a temperature frequency profile.

The method 1200 of FIG. 12 may optionally end following block 1240.

Referring now to FIG. 13, a block diagram is depicted in one example system 1300 operable to determine a temperature in a gas turbine, according to an embodiment of the disclosure.

In certain embodiments, the system 1300 may include a signal generation module 1330 that can be associated with a controller 1310. The signal generation module 1330 may be operable to generate one or more input signals, which may be representative of a desired acoustic wave. In one embodiment, the input signals may be transmitted by the controller 1310 to a sound source associated with a measurement device, such as sound source 120 in measurement device 115 as in FIG. 1. The sound source may be operable to generate an acoustic signal that comprises an acoustic spectrum based on the input signal.

Additionally, the system 1300 may include a temperature determination module 1340 that can be associated with the controller 1310. The temperature determination module 1330 may be operable to determine a temperature in a gas turbine based on a combined acoustic signal. In one embodiment, the temperature determination module 1340 may be receive data suitable for determining the frequency content of the combined acoustic signal from a measurement device, such as measurement device 115 as in FIG. 1. In a further embodiment, the temperature determination module 1340 may be operable to employs fast Fourier transform (FFT) techniques to determine the frequency content of the combined acoustic signal in order to identify a particular frequency corresponding to the one or more signal maxima or the signal minima. Based in part on the identified frequency, the temperature determination module 1340 may be operable to determine a temperature in the gas turbine using the temperature frequency profile.

The controller 1310 may include any number of suitable computer processing components that may, among other things, determine the temperature in a gas turbine. Examples of suitable processing devices that may be incorporated into the controller 1310 include, but are not limited to, personal computers, tablet computers, wearable computers, personal digital assistants, mobile phones, application-specific circuits, microcontrollers, minicomputers, other computing devices, and the like. As such, the controller 1310 may include any number of processors 1360 that facilitate the execution of computer-readable instructions. By executing computer-readable instructions, the controller 1310 may include or form a special purpose computer or particular machine that facilitates processing of the acoustic signals.

In addition to one or more processors 1360, the controller 1310 may include one or more memory devices 1320, and/or one or more communications and/or network interfaces 1380. The one or more memories 1320 may include any suitable memory devices, for example, caches, read-only memory devices, random access memory devices, magnetic storage devices, etc. The one or more memories 1320 may store filter and pulsing data, executable instructions, and/or various program modules utilized by the controller 1310, for example, the signal generation module 1330, the temperature determination module 1340, and an operating system ("O/S") 1350. The one or more memories 1320 may include any suitable data and applications that facilitate the operation of the controller 1310. In certain embodiments, the one or more memories 1320 may be further operable to store data associated with the combined acoustic signal. The O/S 1350 may include executable instructions and/or program modules that facilitate and/or control the general operation of the controller 1310.

Additionally, the O/S 1350 may facilitate the execution of other software programs and/or program modules by the processor(s) 1360, such as, the signal generation module 1330 and the temperature determination module 1340. The signal generation module 1330 and the temperature determination module 1340 may be a suitable software module with corresponding hardware capability configured to allow communication with objects outside the controller 1310. For example, the signal generation module 1330 and the temperature determination module 1340 may communicate with a measurement device, such as measurement device 115 as in FIG. 1, via network interface 1380 and a network.

As desired, embodiments of the disclosure may include a system 1300 with more or fewer components than are illustrated in FIG. 13. Additionally, certain components of the system 1300 may be combined in various embodiments of the disclosure. The system 1300 of FIG. 13 is provided by way of example only.

References are made to block diagrams of systems, methods, apparatuses, and computer program products according to example embodiments. It will be understood that at least some of the blocks of the block diagrams, and combinations of blocks in the block diagrams, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a non-transitory computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide task, acts, actions, or operations for implementing the functions specified in the block or blocks.

One or more components of the systems and one or more elements of the methods described herein may be implemented through an application program running on an operating system of a computer. They also may be practiced with other computer system configurations, including handheld devices, multiprocessor systems, microprocessor based or programmable consumer electronics, mini-computers, mainframe computers, and the like.

Application programs that are components of the systems and methods described herein may include routines, programs, components, data structures, and so forth that implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks may be performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated that the disclosure may be embodied in many forms and should not be limited to the example embodiments described above.

Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The claimed disclosure is:

1. A method for measuring temperature in a turbine, the method comprising:
   directing, via a first waveguide, a first acoustic signal and directing, via a second waveguide, a second acoustic signal towards a gas path in a turbine;
   receiving the first acoustic signal and the second acoustic signal at a downstream gas path location, wherein a difference in length between the first waveguide and the second waveguide results in a phase shift between the first acoustic signal and the second acoustic signal when the signals are received at the downstream gas path location;
   combining the first acoustic signal and the second acoustic signal to create a combined acoustic signal, wherein the combined acoustic signal forms at least one of either a signal maxima or a signal minima; and
   based at least in part on the combined acoustic signal, determining a temperature of the gas path by correlating a frequency of the combined acoustic signal to the temperature of the gas path corresponding to the signal maxima or signal minima.

2. The method of claim 1, wherein determining a temperature of the gas path comprises:
   identifying a first frequency of the first acoustic signal;
   identifying a second frequency of the second acoustic signal; and
   based at least on the first frequency of the first acoustic signal and the second frequency of the second acoustic signal, determining a temperature of the gas path.

3. The method of claim 1, wherein directing a first acoustic signal and a second acoustic signal towards a gas path in a turbine comprises:
   generating, via at least one sound source, an input signal;
   directing the input signal to at least one input microphone;
   transferring the input signal to a wave splitter via an input waveguide;
   splitting, via the wave splitter, the input signal into the first acoustic signal and the second acoustic signal;
   directing the first acoustic signal to the gas path via a carrier waveguide; and
   directing the second acoustic signal to the gas path via an interference waveguide, wherein the interference waveguide is longer than the carrier waveguide.

4. The method of claim 3, wherein a length of the carrier waveguide and a length of the interference waveguide are selected based at least in part on thermal expansion properties of respective materials of the carrier waveguide and interference waveguide.

5. The method of claim 1, wherein directing a first acoustic signal and a second acoustic signal towards a gas path in a turbine comprises:
   generating, via at least one sound source, an input signal;
   directing the input signal to at least two input microphones;
   transferring via a first input microphone the first acoustic signal to a first waveguide; and
   transferring via a second input microphone the second acoustic signal a second waveguide, wherein the second waveguide is longer than the first waveguide.

6. The method of claim 1, further comprising:
   directing the first acoustic signal to a first output microphone;
   directing the second acoustic signal to a second output microphone; and
   attenuating the first acoustic signal at a first damping coil and attenuating the second acoustic signal at a second damping coil.

7. The method of claim 1, wherein when the combined acoustic signal forms a signal maxima, a portion of the first acoustic signal adds with a portion of the second acoustic signal to form the signal maxima.

8. The method of claim 1, wherein when the combined acoustic signal forms a signal minima, a portion of the first acoustic signal cancels out a portion of the second acoustic signal to form the signal minima.

9. The method of claim 1, wherein a frequency of the first acoustic signal and a frequency of the second acoustic signal cover a frequency spectrum encompassing the signal maxima or the signal minima.

10. The method of claim 1, wherein when the combined acoustic signal forms a signal maxima, determining the temperature of the gas path comprises gathering a set of signal maxima at a set of higher frequencies of the first acoustic signal and the second acoustic signal, or when the combined acoustic signal forms a signal minima, determining the temperature of the gas path comprises gathering a set of signal minima at a set of higher frequencies of the first acoustic signal and the second acoustic signal.

11. The method of claim 1, wherein combining the first acoustic signal and the second acoustic signal to create a combined acoustic signal comprises one of:
   combining the first acoustic signal and the second acoustic signal via a wave adder; and mathematically recombining the first acoustic signal and the second acoustic signal.

12. The method of claim 1, wherein combining the first acoustic signal and the second acoustic signal to create a combined acoustic signal further comprises:
  combining, via a wave adder, the first acoustic signal and the second acoustic signal;
  directing, via at least one output waveguide, the combined acoustic signal to at least one output microphone, wherein the at least one output microphone is coupled to analog-to-digital converter;
  generating, via the at least one output microphone, at least one electrical wave based on the combined acoustic signal;
  generating, via the at least one output microphone, at least one analog signal based on the at least one electrical wave; and
  converting, via the analog-to-digital converter, the at least one analog signal into at least one digital signal.

13. A system comprising:
  a measurement device comprising:
    at least one sound source configured to generate an input signal;
    at least one input microphone configured to receive the input signal;
    a wave splitter configured to split the input signal into a first acoustic signal and a second acoustic signal;
    a carrier waveguide configured to direct the first acoustic signal towards a gas path in a gas turbine;
    an interference waveguide configured to direct the second acoustic signal towards the gas path in the gas turbine, wherein the interference waveguide is longer than the carrier waveguide, wherein a difference in length between the carrier waveguide and the interference waveguide results in a phase shift between the first acoustic signal and the second acoustic signal when the signals are received at a downstream gas path location;
    a wave adder configured to combine the first acoustic signal and the second acoustic signal to create a combined acoustic signal, wherein the combined acoustic signal forms at least one of a signal maxima or a signal minima;
    at least one output microphone configured to receive the combined acoustic signal;
    a damping coil configured to dampen the combined acoustic signal; and
    at least one controller configured to:
      based at least in part on the combined acoustic signal, determine a temperature of the gas path by correlating a frequency of the combined acoustic signal to the temperature of the gas path corresponding to the signal maxima or signal minima.

14. The system of claim 13, wherein the at least one controller is further configured to:
  identify a first frequency of the first acoustic signal;
  identify a second frequency of the second acoustic signal; and
  based at least on the first frequency of the first acoustic signal and the second frequency of the second acoustic signal, determine a temperature of the gas path.

15. The system of claim 13, wherein the at least one controller is coupled to the at least one sound source and further configured to generate the input signal from the at least one sound source.

16. The system of claim 13, wherein a length of the carrier waveguide and a length of the interference waveguide are selected based at least in part on thermal expansion properties of respective materials of the carrier waveguide and interference waveguide.

17. The system of claim 13, wherein the at least one controller is further configured to:
  identify the signal maxima in the combined acoustic signal, wherein the signal maxima corresponds to the portion of the first acoustic signal added to the second acoustic signal
  identify the signal minima in the combined acoustic signal, wherein the signal minima corresponds to the portion of the first acoustic signal canceled out by a portion of the second acoustic signal;
  select a first frequency associated with the signal maxima, wherein the first frequency is associated with a first temperature;
  select a second frequency associated with the signal minima, wherein the second frequency is associated with a second temperature; and
  determine the temperature of the gas path based at least in part on the selected first and second frequencies.

18. The system of claim 13, wherein the carrier waveguide and the interference waveguide are disposed between the wave splitter and the wave adder, and wherein the interference waveguide is longer than the carrier waveguide to create a phase shift between the first acoustic signal and the second acoustic signal.

19. A non-transitory computer-readable medium comprising computer-readable instructions operable to:
  direct, via at least one carrier waveguide, a first acoustic signal towards a gas path in a turbine;
  direct, via at least one interference waveguide, a second acoustic signal towards the gas path in the turbine;
  receive, via at least one wave adder, the first acoustic signal and the second acoustic signal at a downstream gas path location, wherein the at least one interference waveguide is longer than the at least one carrier waveguide, wherein a difference in length between the at least one carrier waveguide and the at least one interference waveguide results in a phase shift between the first acoustic signal and the second acoustic signal when the signals are received at a downstream gas path location;
  combine, via the at least one wave adder, the first acoustic signal and the second acoustic signal to create a combined acoustic signal, wherein the combined acoustic signal forms at least one of a signal maxima or a signal minima;
  receive, via at least one output microphone, the combined acoustic signal, wherein the combined acoustic signal is damped by a damping coil; and
  determine, via at least one controller, a temperature of the gas path based at least in part on the combined acoustic signal by correlating a frequency of the combined acoustic signal to the temperature of the gas path corresponding to the signal maxima or signal minima.

20. The non-transitory computer-readable medium of claim 19, wherein the computer-readable instructions are further operable to:
  identify a first frequency of the first acoustic signal;
  identify a second frequency of the second acoustic signal; and
  based at least on the first frequency of the first acoustic signal and the second frequency of the second acoustic signal, determine a temperature of the gas path.

* * * * *